No. 661,839. Patented Nov. 13, 1900.
T. E. ADAMS.
DASH POT FOR ELECTRIC ARC LAMPS.
(Application filed May 7, 1900.)
(No Model.)
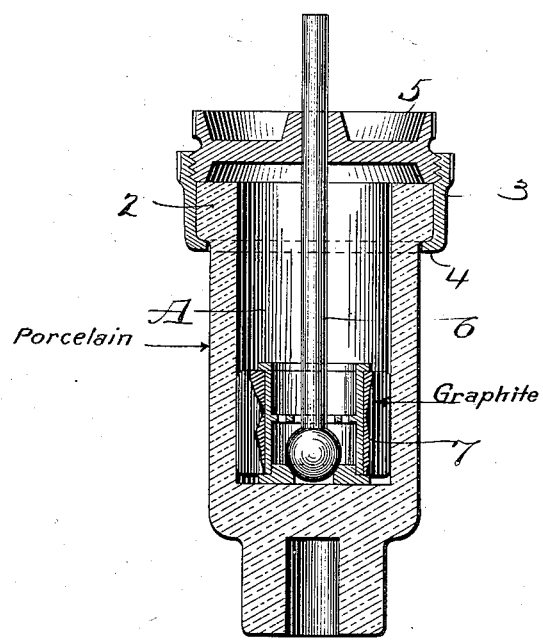
WITNESSES
INVENTOR
T. E. Adams
By H. A. Seymour
Attorney

UNITED STATES PATENT OFFICE.

THOMAS EDGAR ADAMS, OF CLEVELAND, OHIO.

DASH-POT FOR ELECTRIC-ARC LAMPS.

SPECIFICATION forming part of Letters Patent No. 661,839, dated November 13, 1900.

Application filed May 7, 1900. Serial No. 15,766. (No model.)

*To all whom it may concern:*

Be it known that I, THOMAS EDGAR ADAMS, a resident of Cleveland, in the county of Cuyahoga and State of Ohio, have invented certain new and useful Improvements in Air-Pots; and I do hereby declare the following to be a full, clear, and exact description of the invention, such as will enable others skilled in the art to which it appertains to make and use the same.

My invention relates to an improvement in air-pots, and more particularly to air-pots for electric lamps, the object of the invention being to provide an air-pot in which contraction and expansion will be greatly minimized, and hence insure the proper operation of the device in any temperature.

With this object in view the invention consists in certain novel features of construction and combinations and arrangements of parts, as will be more fully hereinafter described, and pointed out in the claims.

The accompanying drawing is a view in section illustrating my improvements.

Heretofore it has been the custom or practice to construct air-pots of metal, and they are therefore very susceptible to changes of temperature, and with a plunger constructed of graphite or plumbago, which responds but slightly to the changes of temperature, the relative sizes of the plunger and air-pot varies greatly according to the temperature, and therefore the operation of the device is not perfect and results in defective operation of the lamp of which it is a part.

My improved air-pot A is constructed of earthenware or porcelain, the contraction and expansion of which in varying temperatures are for all intents and purposes the same as a graphite or plumbago piston, and I provide said pot with a peripheral flange 2 around its open end, and a metal ring 3 is disposed around the pot A and is provided at one edge with an internal shoulder 4, which bears against the flange 2. The ring 3 is made with internal screw-threads to mesh with external screw-threads on a disk 5, having a hole for the passage of the plunger-rod 6, secured to the plunger 7, disposed in the pot and composed, preferably, of graphite or plumbago where it comes in contact with the inner face of the pot, so as to be self-lubricating and at the same time be practically unaffected by variations in temperature.

The plunger-rod 6 is connected with the plunger 7 by a loose ball-and-socket connection and serves as a valve, which closes when the plunger is moved in one direction to prevent the passage of air through the plunger, and thus cause resistance to be offered to the movement of the plunger. When the plunger is moved in the opposite direction, the valve will open and air will pass freely through to permit the free movement of the plunger. Any other form of valve may be used for the same purpose, if desired, or a solid plunger without any valve may be employed.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. An air-pot for electric lamps, comprising a cylinder of earthenware having one end permanently closed and a graphite plunger within said earthenware cylinder and provided with a plunger-rod.

2. An air-pot for electric lamps, comprising a porcelain cylinder permanently closed at one end, a graphite plunger within the porcelain cylinder and a combined valve and rod connected with said graphite plunger and projecting through the open end of the cylinder.

3. An air-pot for electric lamps, comprising a porcelain cylinder permanently closed at one end and having a smooth bore, an external flange at the open end of the porcelain cylinder, a flanged internally-threaded ring embracing the flange on the cylinder, a plunger in the cylinder, a disk screwed into said ring and having a central hole, and a plunger-rod attached to the plunger and passing freely through the hole in the disk.

In testimony whereof I have signed this specification in the presence of two subscribing witnesses.

THOMAS EDGAR ADAMS.

Witnesses:
WM. D. ERTEL,
T. E. CALLAHAN.